United States Patent [19]

Liedek et al.

[11] Patent Number: 5,273,577
[45] Date of Patent: Dec. 28, 1993

[54] BISMUTH PHOSPHOVANADATE PIGMENTS

[75] Inventors: Egon Liedek, Esslingen; Helmut Knittel, Ludwigsburg; Hans-Ulrich Reisacher, Weinstadt; Norbert Mronga, Dossenheim; Harald Ochmann, Dannstadt-Schauernheim; Henning Wienand, Neulussheim, all of Fed. Rep. of Germany

[73] Assignee: BASF Aktiengesellschaft, Ludwigshafen, Fed. Rep. of Germany

[21] Appl. No.: 998,677

[22] Filed: Dec. 30, 1992

[30] Foreign Application Priority Data

Jan. 16, 1992 [DE] Fed. Rep. of Germany ....... 4200925

[51] Int. Cl.$^5$ ............................................. C04B 14/30
[52] U.S. Cl. .................................................. 106/479
[58] Field of Search ........................................ 106/479

[56] References Cited

U.S. PATENT DOCUMENTS 4,115,141  9/1978  Piltiygsrad .
4,230,500 10/1980  Balducci et al. .
4,455,174  6/1984  Wienand et al. .

FOREIGN PATENT DOCUMENTS 0441101  8/1991  European Pat. Off. .
3221338 12/1983  Fed. Rep. of Germany .
2355779  1/1978  France .
WO92/11205  7/1992  PCT Int'l Appl. .

Primary Examiner—Mark L. Bell
Assistant Examiner—Scott L. Hertzog
Attorney, Agent, or Firm—Oblon, Spivak, McClelland, Maier & Neustadt

[57] ABSTRACT

An essentially monoclinic bismuth vanadate of the formula $Bi[V_{1-x}P_x]O_4$ where x is from 0 to 0.1 has a chroma of $\geq 85$, a lightness of $\geq 80$, a hue angle of from 89 to 95 and a photochromism with a $\Delta E$ value of $\leq 2$ under the CIELAB system.

8 Claims, No Drawings

BISMUTH PHOSPHOVANADATE PIGMENTS

U.S. Pat. Nos. 4,115,141 and 4,115,142 disclose monoclinic bismuth vanadate pigments and a process for preparing them. However, products prepared as described in these patents do not meet present-day color requirements.

Furthermore, U.S. Pat. Nos. 4,251,283 and EP-A-441 101 describe bismuth vanadate pigments which contain phosphorus and are obtained via a solid-state reaction. These products too fail to meet color requirements.

EP-A-239 526, EP-A-74 049 and DE-A-3 106 625 describe tetragonal bismuth vanadate pigments which do not match the brilliance of the monoclinic products.

DE-A-4 037 878 discloses attempts to stabilize bismuth vanadate pigments to the action of hydrochloric acid, and EP-A-304 399 reveals efforts to obtain coloristically improved products.

It is an object of the present invention to provide bismuth vanadate pigments having improved coloristic and application properties.

We have found that this object is achieved by an essentially monoclinic bismuth vanadate of the formula $Bi[(V_{1-x}P_x)O_4]$ where x is from 0 to 0.1 with a chroma of $\geq 85$, a lightness of $\geq 80$, a hue angle of from 89 to 95 and a photochromism with a $\Delta E$ value of $\leq 2$ under the CIELAB system.

The CIELAB terms chroma, lightness and hue angle are known from the literature, for example Hans G. Völz, Industrielle Farbprüfung, Grundlagen und Methoden, VCH Verlagsgesellschaft mbH, Weinheim, 1990, and R. W. G. Hunt, Measuring Colour, Ellis Horwood Limited, West Sussex (England) 1987.

Photochromism is defined in Römpps Chemie-Lexikon vol. 4 (1985), as the response of a substance exposed to visible or ultraviolet light whereby it changes reversibly into a substance which differs from the original substance in color (absorption spectrum).

The products according to the invention preferably have x from 0.001 to 0.08, in particular from 0.01 to 0.06.

Preference is also given to pigments where x is from 0.002 to 0.01.

The products according to the invention are advantageously prepared by taking an alkaline solution of an alkali metal vanadate or of ammonium vanadate and with a soluble phosphate present a) adding to it an acidic bismuth salt solution, adjusting the pH with alkali to 3–6.5 and maintaining it at that level by further addition of alkali during the subsequent heating at up to 100° C. until the pH ceases to decrease, after 0.5–5 hours isolating the product, washing it salt-free, drying, and heat-treating it at 300°–500° C., or b) adding it to an acidic bismuth salt solution, adjusting the pH to 2–5, stirring under these conditions for about 1 hour, then raising the pH to 5–8, heating to the reflux temperature while maintaining that pH, then continuing heating for about a further 0.5–2 hours, isolating the product and washing and drying it.

Details of the preparation are given in the Examples, where parts and percentages are by weight, unless otherwise stated.

Pigments according to the invention with even better properties are obtained when an alkali or alkaline earth metal sulfate, borate or perborate is added to the alkaline vanadate solution in an amount of from 5 to 50, preferably from 5 to 30, mol %, based on the bismuth concentration, before the reaction.

Suitable alkali metal ions for the vanadates and the aforementioned anions are in particular sodium and potassium. The bismuth is preferably used in the form of the nitrate.

Before the pigments are heated in the aqueous suspension it can be advantageous to carry out a hydrothermal treatment stage, since this can improve the crystallinity. The hydrothermal treatment is customarily carried out at from 110° to 300° C., preferably at from 150° to 250° C.

After they have been prepared according to the invention, the pigments may additionally be subjected to a stabilizing treatment, as described for example in U.S. Pat. No. 4,063,956. This improves the thermal stability and the resistance to acids and reducing agents The pigments of the invention are suitable for example for coloring plastics, coatings and cosmetic products, the coatings sector being particularly important.

The coating compositions for the colorimetric assessment of the pigments are produced by incorporating 20 g of pigment into 80 g of an alkyd-melamine baking finish (45% solids content) by shaking for 60 minutes with 150 g of glass balls (3 mm diameter) using a Skandex machine, applying hiding coats to aluminum Q panels by spraying, and baking at 130° C. for 30 minutes. These coats are then measured with a Zeiss RFC 16 spectrophotometer.

The photochromism is determined by covering one half of the panel with a piece of metal, then irradiating for 3 hours with a 1000 watt floodlight (Sylvania, 1000 W halogen lamp, code No. 21 625 9, collimated) at a distance of 45 cm, and immediately thereafter subjecting the irradiated and the nonirradiated part of the panel in question to a comparative measurement with the above-specified spectrophotometer (difference between means of three measurements each).

EXAMPLES

Example 1

121.25 g of $Bi(NO_3)_3 \times 5H_2O$ are dissolved in 600 ml of 1N $HNO_3$. A solution of 34.9 g of $NaVO_3 \times H_2O$ and 22 g of NaOH in 598 ml of $H_2O$ is added with stirring. Then a pH of 3.5 is set with 30% strength NaOH and thereafter the mixture is stirred at room temperature for 1 hour.

Then the pH is raised from 3.5 to 6.0 in the course of 1 hour with 1N NaOH and the mixture is then heated to the reflux temperature while maintaining the pH at 6 by adding 1N sodium hydroxide solution. After 3 hours the mixture is cooled down to room temperature, and the product is filtered off, washed salt-free and dried at 90° C. under reduced pressure. The X-ray powder diagram shows the lines of the monoclinic crystal form of bismuth vanadate.

The pigment is examined according to the above-described method and is found to have a color locus of $H° = 90.5$, $C* = 86.8$, and $L* = 80.0$, and a photochromism of $\Delta E = 1.3$.

Example 2

Example 1 is repeated, except that 60.6 g of $Bi(NO_3)_3 \times 5H_2O$ are dissolved in 240 ml of 1N $HNO_3$ and a solution comprising 17.45 g of $NaVO_3 \times H_2O$ and 10 g of NaOH in 274 ml of $H_2O$ and additionally containing 11.4 g of $Na_3PO_4 \times 12H_2O$ is added.

Crystal system: monoclinic
Phosphorus content: <0.03%
Color locus: H°=90.7, C*=91.2, L*=83.0
Photochromism: ΔE=0.2

Example 3

Method as for Example 1, except that the bismuth component used is a mixture of 237.2 g of an 11% strength bismuth nitrate solution with 5.4 g of 65% strength nitric acid and 45 g of water.
Crystal system: monoclinic
Phosphorus content: <0.03%
Color locus: H°=90.7, C*=92.3, L*=82.9
Photochromism: ΔE=0.6

Example 4

Materials and method as for Example 3, except that refluxing is carried out not for 3 but for 5 hours.
Crystal system: monoclinic
Phosphorus content: <0.03%
Color locus: H°=90.7, C*=90.7, L*=82.2
Photochromism: ΔE=0.3

Example 5

Method as for Example 3, except that only half the amount, ie. 5.7 g, of $Na_3PO_4 \times H_2O$ is used.
Crystal system: monoclinic
Phosphorus content: <0.03%
Color locus: H°=90.9, C*=91.4, L*=82.6
Photochromism: ΔE=1.4

Example 6

Method as for Example 3, except that the amount of nitric acid added to the bismuth solution is more than doubled, ie. 11.9 g, and the $Na_3PO_4 \times H_2O$ added to the vanadate solution is replaced by 4.62 g of $NaBO_2 \times H_2O_2 \times 3H_2O$.
Crystal system: monoclinic
Boron content: <0.01%
Color locus: H°=92.0, C*=92.2, L*=83.9
Photochromism: ΔE=1.8

Example 7

Method as for Example 5, except that the amount acid added to the bismuth solution is more than doubled, ie. 10.8 g, and an additional 2.31 g of $NaBO_2 \times H_2O_2 \times 3H_2O$ are added to the vanadate solution.
Crystal system: monoclinic
Phosphorus content: <0.01%
Boron content: <0.01%
Color locus: H°=91.4, C*=92.4, L*=83.4
Photochromism: ΔE=0.1

Example 8

Method as for Example 7, except that the initial batch weight is increased by 50% and only 4.28 g of sodium phosphate are added to the vanadate solution.
Crystal system: monoclinic
Phosphorus content: <0.01%
Boron content: <0.01%
Color locus: H°=90.8, C*=93.4, L*=83.7
Photochromism: ΔE=0.6

Example 9

Method and materials as for example 7, except that the batch is adjusted to pH 4, not pH 3.5, and left at that pH and at room temperature for 1 hour.
Crystal system: monoclinic
Phosphorus content: 0.02%
Boron content: <0.01%
Color locus: H°=91.6, C*=92.4, L*=84.3
Photochromism: ΔE=0.5

Example 10

15.7 g of $V \triangleq 196.5$ ml of sodium vanadate solution containing 79.92 g of vanadium per liter are diluted with 500 ml of water and then 2.3 g of $H_3PO_4$ (85% strength) are added. 68.7 g $\triangleq$ 621.7 g of bismuth nitrate solution containing 11.05% of Bi are added to this mixture with stirring in the course of about 40 min.

Then the mixture is adjusted with 30% strength NaOH to pH 4.5 in the course of about 1 hour (NaOH consumption about 140 ml) and thereafter to a pH 5 with 5% strength NaOH over about 10 min.

This is followed by stirring for 1 hour while the pH is maintained at 5.

Then the pale brown suspension is heated to 95° C. while pH 5 is maintained. After about 1 hour the suspension turns yellow and the pH increases continuously to pH 7.6. The suspension is stirred until the pH is constant, at which point the product is filtered off and washed salt-free. The filter residue is made up with water to 800 ml and heated to 80° C. To this suspension is added a solution of 15.4 g of $Al(NO_3)_3 \times 9H_2O$ in 100 ml of water while the pH is maintained at pH 7 with 10% strength sodium carbonate solution. Then a suspension of 2.6 g of $Ca(OH)_2$ in 100 ml of water is added at the same time as 2.7 g of $H_3PO_4$ (85% strength) in 100 ml of water and the pH is maintained at 6.5 with 10% strength sodium carbonate solution (sodium carbonate consumption about 48 ml).

The product is filtered off, washed salt-free and dried at 110° C. The X-ray powder diagram shows the lines of the monoclinic crystal form of bismuth vanadate. The dried product is heated to 400° C. and maintained at that temperature for 30 min. The pigment has the following color data:
H°=93.6, C*=93.2, L*=88.5
Photochromism: ΔE=0.2

We claim:

1. An essentially monoclinic bismuth vanadate of the formula $Bi[(V_{1-x}P_x)O_4]$ where $0<x\leq 0.1$ with a chroma of $\geq 85$, a lightness of $\geq 80$, a hue angle of from 89 to 95 and a photochromism with a ΔE value of $\leq 2$ under the CIELAB system.

2. A bismuth vanadate as claimed in claim 1 where x is from 0.001 to 0.08.

3. A bismuth vanadate as claimed in claim 1 where x is from 0.01 to 0.06.

4. A bismuth vanadate as claimed in claim 1 where x is from 0.002 to 0.01.

5. A process for preparing a bismuth vanadate as claimed in claim 1, which comprises taking an alkaline solution of an alkali metal vanadate or of ammonium vanadate and with a soluble phosphate present
   a) adding to it an acidic bismuth salt solution, adjusting the pH with alkali to 3-6.5 and maintaining it at that level by further addition of alkali during the subsequent heating at up to 100° C. until the pH ceases to decrease, after 0.5-5 hours isolating the product, washing it salt-free, drying, and heat-treating it at 300°-500° C., or
   b) adding it to an acidic bismuth salt solution, adjusting the pH to 2-5, stirring under these conditions for about 1 hour, then raising the pH to 5-8, heating to the reflux temperature while maintaining that pH, then continuing heating for about a further 0.5-5 hours, isolating the product and washing and drying it.

6. A process as claimed in claim 5, wherein an alkali or alkaline earth metal sulfate, borate or perborate is added to the alkaline vanadate solution before the reaction.

7. A process as claimed in claim 6, wherein from 5 to 50 mole percent of additives is added to the vanadate solution.

8. A process as claimed in either of claims 5 and 6, wherein the suspension obtained from the reaction is treated under hydrothermal conditions at from 110° to 300° C. for from 0.1 to 5 hours.

* * * * *